Oct. 10, 1950        E. L. WIEDMAN        2,525,506

TRAILER

Filed Feb. 10, 1947        4 Sheets-Sheet 1

Edward L. Wiedman
Inventor
By [signature]
Attorney

Patented Oct. 10, 1950

2,525,506

UNITED STATES PATENT OFFICE 2,525,506

TRAILER

Edward L. Wiedman, Tonawanda, N. Y.

Application February 10, 1947, Serial No. 727,717

11 Claims. (Cl. 280—33.4)

This invention relates to automobile trailers and more particularly to the chassis of a trailer.

Among the objects of my invention is the production of a trailer chassis particularly adapted for delivery purposes, which is so constructed that a delivery body may be attached thereto in a simple manner and be retained thereon in horizontal position, with means provided for tilting the body to readily dump the contents of the same; to provide a chassis which is easily assembled in the process of manufacturing the same and which includes pivotally-mounted wheel-supports cast to form and requiring a minimum of machine work; to provide a chassis whose frame is constructed of tubular members welded together and having means for pivotally securing a body thereto in a plane between the ends of the body and which includes yielding wheel-supports at opposite sides of the frame readily attachable thereto or detachable therefrom so that the parts of the chassis may be disassembled and stored in a small space when not in use; to provide a chassis in which the traction wheels are of comparatively small diameter so that a low center of gravity is provided, tending to hold the trailer snugly to the road when traveling light or with a light load; and to so construct the wheel-supports as to permit the use of long springs within a compact space and thus assure an easy ride over all types of roads.

Other objects of my invention are, to provide wheel-supports rotatably adjustable on the frame of a chassis so that the centers of the traction wheels can be changed with respect to the axes of said supports, whereby the inclination of the springs can be quickly changed to vary the load resistance, accomplished by increasing or diminishing the tension of the springs; to provide wheel units or mountings which are separately attachable or detachable from the chassis-frame so as to assure easy assembling of the parts of the chassis and convenience in storing the same; and to provide a wheeled front-end prop for the chassis which is simple in construction, conveniently swung into propping or non-propping position and so maintained and which has its wheel swiveled so that the trailer can be easily moved about to position it for convenient connection of its reach or tongue with the rear bumper or other portion of an automobile.

Still further objects are to provide novel means to attach the wheel-supports to the chassis-frame and so that said means serve also as adjusting means for regulating the tension of the springs to conform to the load to be carried; to provide a chassis in which the traction wheels are enabled to operate under knee-action and thus prevent bouncing of the trailer when riding over a rough road or encountering an obstruction; and further, to so construct the chassis-frame that any type of body attached thereto will balance the load and take the strain off the front end of the reach or tongue and consequently off the bumper or other part of the automobile to which the trailer is attached.

With the above and other objects in view to appear hereinafter, my invention consists in the novel features of construction, and in the arrangement and combination of parts to be hereinafter described and more particularly pointed out in the appended claims.

Now referring to the drawings in detail, the reference numeral 20 designates the chassis, considered as a whole. This chassis includes a chassis-frame 21, wheel-supports 22 pivotally adjustable on the chassis-frame by means of saddle members to be hereinafter described, traction wheels 23 rotatably mounted in or on the wheel-supports and a front-end prop 24 pivotally secured to the front end of the chassis and with said traction wheels serve as a three point road-contact when the chassis is at rest, and 25 a trailer body (shown in Fig. 9) preferably pivotally mounted on the chassis.

Figure 1:
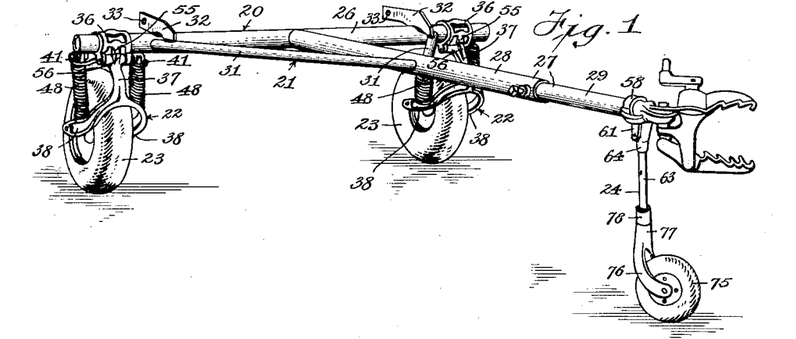
Fig. 1 is a perspective view of a chassis constructed in accordance with this invention.
Figures 11, 12:
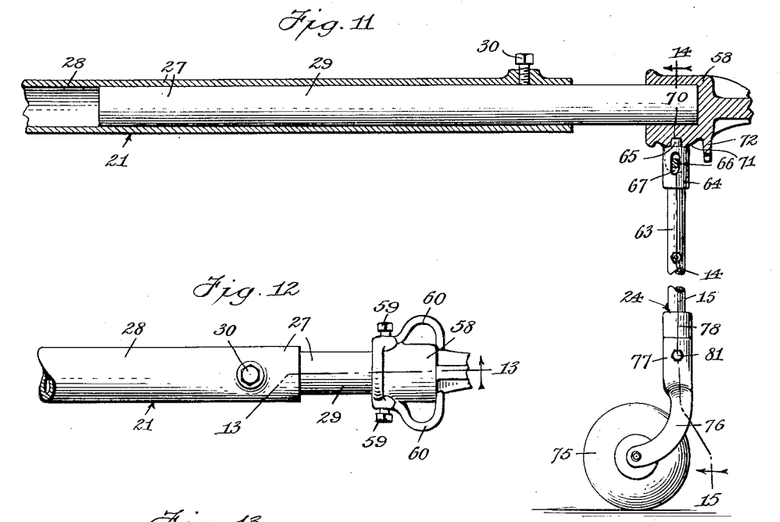
Fig. 11 is a sectional elevation of the front portion of the reach or tongue and the prop pivotally secured to the front end thereof.
Fig. 12 is a plan view of the front-end of the reach or tongue, including a portion of the prop-socket at the front end thereof.

The chassis-frame 21 is constructed of tubular members, in part welded together and in part arranged to telescope, and it comprises a transverse tubular member 26 and a longitudinal member 27, which I prefer to term a reach or tongue and which is welded at its rear end to said transverse tubular member 26 centrally between its ends and extends forwardly therefrom. This reach or tongue is formed in two sections 28, 29 of interfitting sizes so that the front or outer section 29 may be telescoped into the rear or inner section 28 to any degree desired and be held in position by a set screw 30 so as to provide the desired length for the reach or tongue, said set screw being passed through the larger section near its front and impinging against the smaller or inner section to hold the latter in any adjusted position. This set screw is preferably at the side of the reach or tongue, as shown in Fig. 1, so that it is easily accessible when a long body is fastened to the chassis, or it may be at the top of the reach or tongue when a short body is used and does not overhang the front end of the rear or inner section of said reach or tongue, as shown in Figs. 11 and 12.

In order to provide a rigid chassis-frame, I further connect the transverse tubular member 26 with the reach or tongue by tubular brace-members 31, the brace-members being welded at their front ends at opposite sides of the reach or tongue and at their rear ends to the transverse tubular member at points distant from the region of connection of the reach or tongue with said transverse member. This chassis-frame is, therefore, of simple construction requiring comparatively little machine work and only simple welding together of the tubular members.

Figures 8, 9, 10:
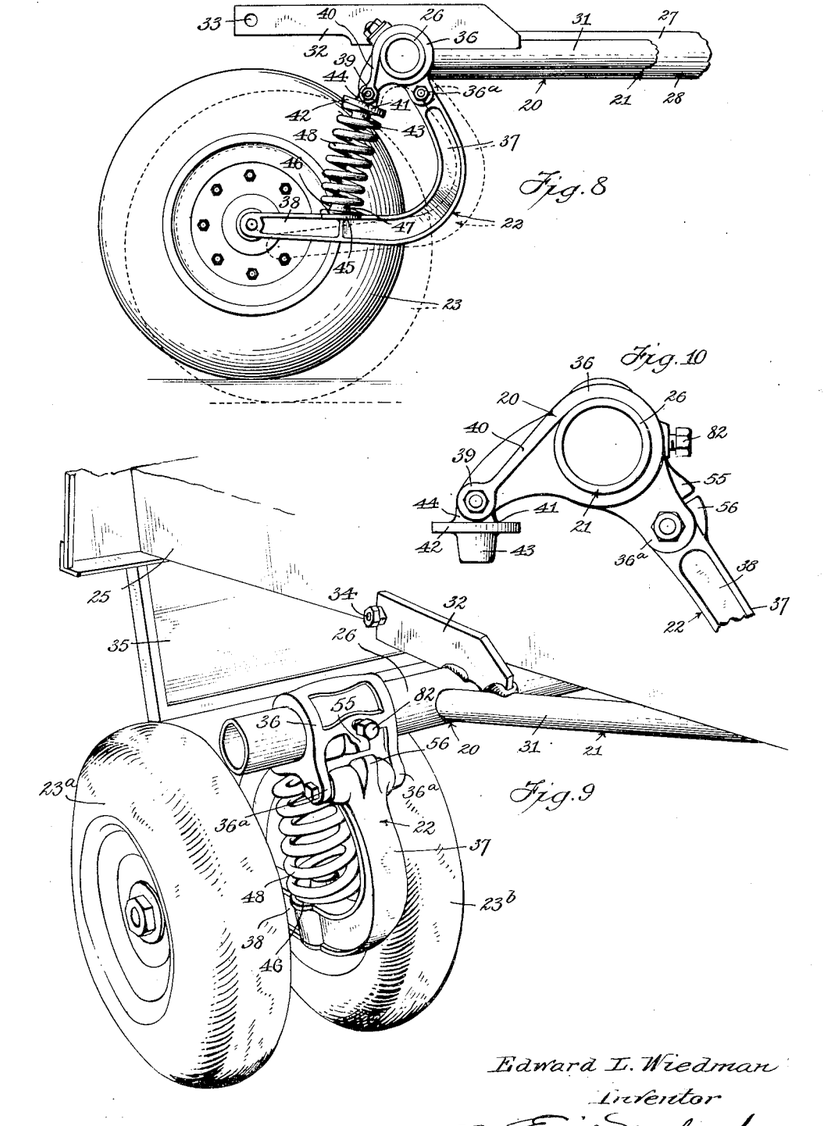
Fig. 8 is a view similar to Fig. 2, showing one of the traction wheels and its wheel-support in a position adapted to carry a heavy load and showing in dotted lines the position of such parts corresponding to those of the same parts in Fig. 3.
Fig. 9 is a perspective view of a portion of the chassis-frame, a portion of the body attached thereto a modified form of the wheel-support pivotally attached to the chassis-frame and adapted to support dual traction wheels.
Fig. 10 is a side elevation of the saddle-member shown in Fig. 9, in association with adjacent parts of the wheel-support.

For the purpose of attaching a trailer body to the chassis-frame, two transversely-spaced connector members 32 are provided. These connector members are spaced apart a distance to receive a trailer body 25 between them and they are in the form of elongated bars or plates set on edge so that the front end of each lies against a brace-member 31 a short distance from its rear end and against the upper portion of the transverse tubular member 26. If desired, the lower edge of each of these plates may be slightly notched to conform to the transverse curvature of the transverse tubular member and at their points of contact with the brace-members and said transverse member they are welded thereto and thus form a rigid part of the chassis-frame. Each of these supporting members extends rearwardly a distance beyond the transverse tubular member 26 and they have transversely alined pivot-holes 33 for the reception of pivots 34 by means of which the trailer body 25 is pivotally secured to the chassis-frame. The trailer body, as shown in Fig. 9, extends rearwardly a distance from said transverse tubular member and may extend forwardly therefrom a like or any other distance desired, but preferably so that the load carried will be balanced. Thus it will be apparent that the body is so mounted on the trailer chassis that it may be used as a dump body, it having a gate 35 shown lowered in Fig. 9 to permit the contents of the body to be easily delivered when tilting the body.

To prevent accidental tilting of the body on the trailer chassis, the front end thereof may be hooked, tied or otherwise anchored to the tongue or reach where it extends over the latter, and as such means forms no part of this invention, it is not shown in the drawings.

Figures 4, 5, 6, 7:
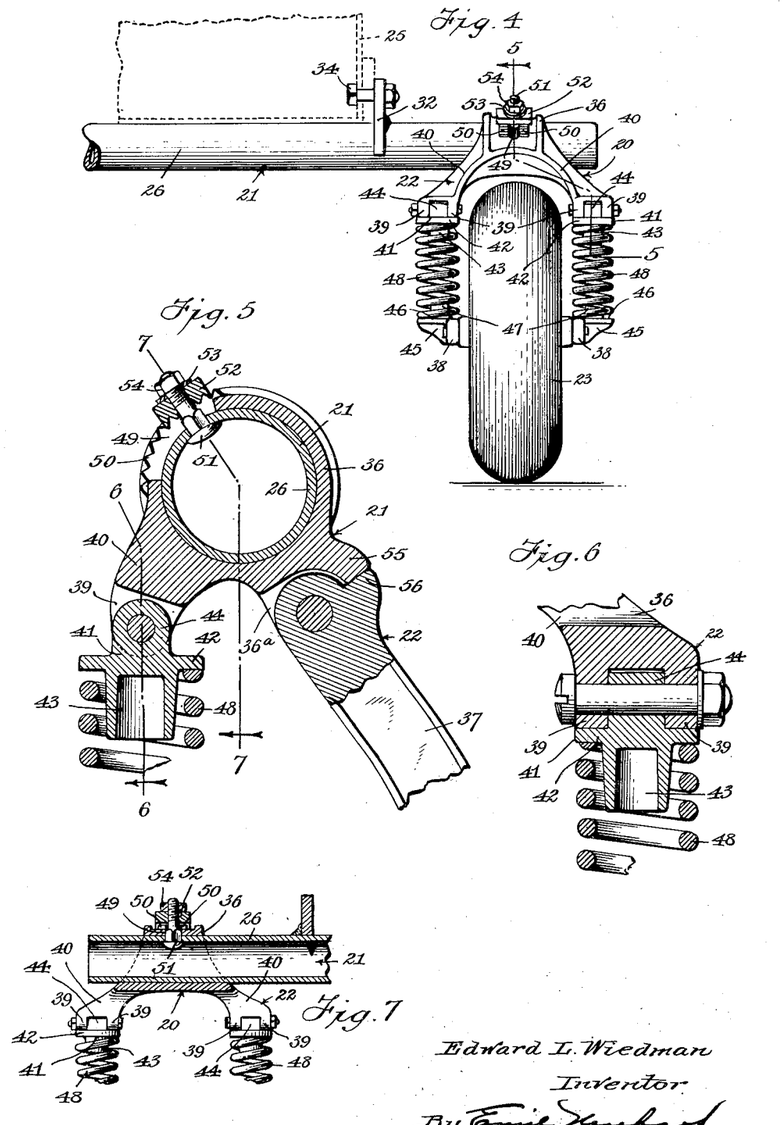
Fig. 4 is a rear levation of a portion of the chassis-frame, one of the wheel-supports and the traction wheel carried by said support.
Fig. 5 is an enlarged section taken on line 5—5, Fig. 4, looking in the direction of the arrow crossing said line, the traction wheel being omitted.
Fig. 6 is a section taken on line 6—6, Fig. 5, looking in the direction of the arrow crossing said line.
Fig. 7 is a section on a reduced scale taken on line 7—7, Fig. 5, looking in the direction of the arrow crossing said line.

The connector members 32 are spaced inwardly from the outer ends of the transverse tubular member 26 so that the latter extends outwardly a distance, as clearly shown in Figs. 4 and 9. On these projecting ends, collar-like saddle-members 36 are mounted in a manner to permit of rotative adjustment thereon. Extending downwardly and forwardly from each saddle-member are spaced-apart lugs 36ª serving as a forked extension and pivotally attached between the lugs of each extension is a wheel support 22. Each wheel support 22 is of yoke-like or substantially V-formation and has an upwardly and rearwardly extending arm 37 whose upper or free end is pivotally connected to the forked extension 36ª of a saddle-member, said arm being curved at its lower end to form a rearwardly-facing bight merging into spaced-apart rearwardly extending arms 38. The lower or rear portion of each yoke-like wheel support is, therefore, forked to receive a traction wheel 23 suitably journaled on an axle secured to the free terminals of said rearwardly extending arms, or otherwise arranged, to rotate in the forked rearwardly extending portion of said yoke-like or substantially V-shaped wheel support. The yoke-like or V formation given the wheel supports, or wheel-supporting members as they may be termed, results in the arms or arm portions 37 and 38 being disposed in diverging relation with a rearwardly-facing bight portion between the two arms or arm portions; the arm 37 on each wheel support or wheel-supporting member overlying the bight or bight portion of the latter and the portion of the arm 38 adjacent said bight or bight portion.

Each collar-like saddle-member is also provided with spaced-apart rearwardly and downwardly-extending lugs 39 formed on the lower or outer ends of two arms 40, one extending outwardly and downwardly and the other inwardly and downwardly from said saddle-member, the lugs being paired in planes at opposite sides of and spaced from the traction wheel associated with the yoke-like wheel support attached to each collar-like saddle-member, as clearly shown in Fig. 4. Pivotally secured to each pair of lugs 39 is a spring-retaining member 41 having a spring-bearing disk 42, a spring-retaining nub 43 axially-disposed on and depending from said disk and a lug 44 extending upwardly from said disk and fitting between the lugs 39 at each side of the traction wheel.

Extending from the rearwardly extending arm portions 38 at their upper edges are seat-extensions 45, the upper surfaces of which are flush with the upper edges of said arm portions so that said edges and the upper surfaces of said extensions serve as spring-seats 46 and extending upwardly from these spring-seats are spring-retaining nubs 47. Interposed between the spring-retaining members 41 and the said spring-seats 46 are coil or spiral springs 48 into opposite ends of which said spring-retaining nubs 43 and 47 are entered. Thus under the weight of the chassis-frame and the body attached thereto, whether loaded or unloaded, the springs are retained between the rearwardly extending portions of the arms 38 and the collar-like saddle-members 36.

It is to be noted that the axes of the traction wheels are disposed in a plane a considerable distance in rear of the axes of the collar-like saddle-members 36 and that the axis of the spring-retainer at the upper end of each spring is beneath and in rear of the axis of its associated collar-like saddle-member and that consequently the traction wheels travel in contact with the road surface under knee-action.

As previously stated, the collar-like saddle-members are rotatably adjustable on the chassis-frame, or more particularly on the projecting ends of the transverse tubular member 26, and to permit of this a transversely-disposed slot 49 is arranged in each saddle-member and at opposite sides of this slot a toothed or serrated rib 50 is exteriorly arranged on the saddle-member. A securing bolt 51 is passed outwardly from the interior of the tubular transverse member 26 through an opening in the latter which registers with the transversely-disposed slot 49 in the saddle-member, the bolt projecting outwardly a distance from the saddle-member and having a securing plate 52 placed thereover which is provided with teeth corresponding and adapted to mesh with the teeth of the toothed or serrated ribs 50 formed at opposite sides of the slot. A lock-washer 53 may be placed over the bolt so as to bear against the securing plate and a nut 54 threaded onto the bolt to secure the plate in any adjusted position of the saddle-member, as shown in Fig. 5. In some instances the lock-washer may be dispensed with, as shown in Fig. 7.

Viewing Fig. 8 and assuming the traction wheels and their wheel supports to be in the positions shown in dotted lines, it will be apparent that upon loosening the securing bolts 51 and swinging the wheel supports rearwardly and upwardly to assume the position shown in full lines, the spiral springs 48 will be slightly compressed and consequently placed under greater tension. During such action the axes of the traction wheels 39 will assume a somewhat more rearward and higher position and this is also true of the spring-seats 46. This results in the spring-retaining member 41 being swung slightly rearwardly and upwardly and due to the lower ends of the spiral springs moving a greater distance than the upper ends under such adjustment of the traction wheels and their supports, the spiral springs are inclined to a greater degree, which also adds to the resistance which they offer.

Figures 2, 3, 16, 17:
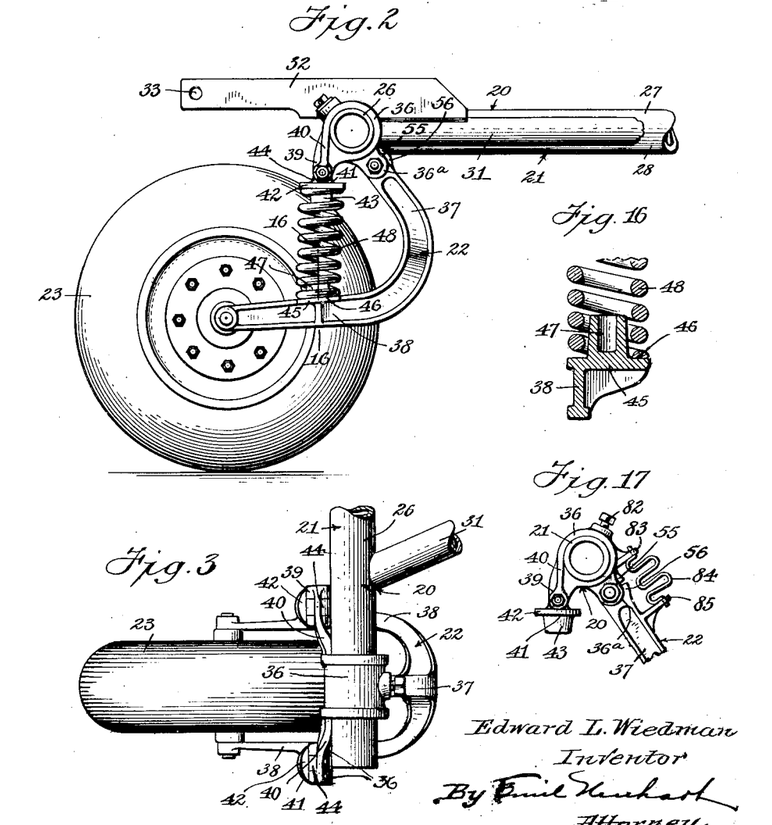
Fig. 2 is a side elevation of the chassis, the front portion of the reach or tongue being broken away.
Fig. 3 is a top plane view of one of the wheel-supports and the adjacent portion of the chassis-frame.
Fig. 16 is an enlarged section taken on line 16—16, Fig. 2.
Fig. 17 is a side elevation of a modified form of my invention showing a buffer-spring interposed between the saddle-member and the wheel-supporting arm.

It will be noticed that when the wheels are in the positions shown in Fig. 2 and in dotted lines in Fig. 8, the spiral springs are practically vertically disposed and expanded to their greatest degree, under which they offer the least resistance. With the wheels so positioned, the wheel-supporting arms are adjusted to carry a light load and a change in adjustment of the wheel-supporting arms is accomplished by rotating the collar-like saddles 36 on the end portions of the transverse tubular member 26. When the nuts 54 of the securing bolts 51 are loosened, the teeth on the securing plates 52 may be disengaged from the toothed or serrated ribs 50 and thus the collar-like saddle-members will be free to be rotated on the transverse tubular member. Rotating the saddle-member at one end of the tubular member clockwise and at the other end thereof counter-clockwise will swing the wheel-supporting members rearwardly and upwardly, while a reverse action of each of these saddle-members will result in swinging said members forwardly. Upon rotating the saddle-members after loosening the bolts 51, the teeth on the securing plates 52 will become unmeshed and locked into a different set of teeth on the serrated ribs 50 and when then tightening the nuts 54 on the bolts 51, the saddle-members will be fastened in adjusted position on the transverse tubular member 26, which may be referred to as pivots for said saddle-members.

When the arms 38 are in the position shown in Fig. 2, the wheel supports are adjusted to carry light loads and the springs cradled thereon will permit the transportation of eggs or other light loads of fragile articles with safety, since the resiliency of the springs and the fact that the axes of the traction wheels are in a plane considerably in rear of the plane in which the pivots of the arms are arranged. The spiral springs assure what may be termed a floating ride, during which the traction wheels travel in firm contact with the road surface following any irregularities in the surface without bouncing of the wheels. When the wheel supports or wheel-supporting members are adjusted to the positions shown in full lines in Fig. 8, the springs are tensioned to support a heavier load because they are subjected to greater compression and are also disposed at a greater angle than that shown in Fig. 2.

In order to assume retention of the ends of the springs over their retaining-nubs 43 and 47, the saddle-members 35 are provided with stop lugs 55 which are adapted to be engaged by lugs 56 formed on the front edges of the wheel-supporting members adjacent their pivots. When the trailer body is unloaded these lugs may be in contact, but when loaded the weight carried by the coil springs, regardless of their adjustment, cause slight swinging movement of the wheel-supporting members, whereupon the said lugs become slightly spaced apart and any rebound caused by traveling over an extremely rough road or when encountering an obstruction on the road, will be checked by contact of the lugs 56 on the wheel-supporting members with the stop lugs 55 on the saddle-members.

When the load carried is wholly within or above the trailer body, the reach or tongue 27 of the trailer body may be fully telescoped and the chassis reduced to its shortest length. When, however, long articles such as timber, pipes and the like are to be transported, gates at the front and rear ends of the body (the first not shown) may be lowered and the articles transported permitted to extend the necessary distance from the front and rear of the body. At such times the reach or tongue 27 will be extended, and to permit of such adjustment, the securing screw 30 passed through the large section 28 of said reach or tongue being loosened and then tightened to impinge against another portion of the smaller section 29 telescoped thereinto. Thus the reach or tongue may be adjusted to accommodate various types of loads. The front end of the smaller, or inner section as it may be termed, of the reach or tongue has a hitch-socket 58 fitted thereover which is fastened thereto by means of securing screws 59. This hitch-socket has one or more loops or eyes 60 extending laterally therefrom through which chains or the like may be passed, having connection with a boat carried in or on the trailer body. Upon moving the trailer to the beach of a body of water and backing the same a distance into the water, a chain or other connection passed through said eyes or loops may be paid out to enable the boat to be moved into the body of water the necessary distance so that it will automatically rise from the body of the trailer and be delivered into the water in a floating condition, after which the trailer may be drawn upwardly onto the beach.

Figures 13, 14, 15:
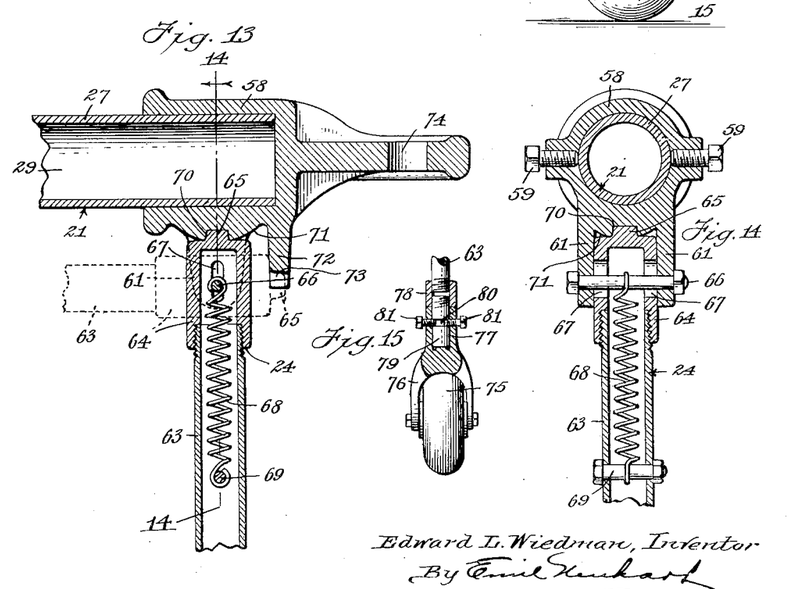
Fig. 13 is an enlarged section through the front end of the reach or tongue and the upper portion of the prop pivotally connected thereto, taken on line 13—13, Fig. 12, looking in the direction of the arrow crossing said line.
Fig. 14 is a section taken on line 14—14, Fig. 13, looking in the direction of the arrow crossing said line.
Fig. 15 is a vertical section taken on line 15—15, Fig. 11, looking in the direction of the arrow crossing said line.

The hitch-socket 58 has a pair of spaced-apart depending lugs 61 to which the prop or front-end support 24 is pivotally attached. The main portion of the prop is in the form of a tube or pipe 63, the upper or inner end of which is threaded into a socket 64 which has a lock-nub 65 extending axially from its upper end. This prop is pivotally connected to the spaced-apart depending lugs 61 on the hitch-socket by means of a pivot bolt 66 passed through said lugs and through longitudinal diametrically-opposite slots 67 in the socket 64. Within said prop is a spiral spring 68 having one end secured to said pivot bolt and at its other end secured to a bolt 69 passed diametrically through the tubular body 63 of said prop, the action of the spring being such as to move the upper or inner end of the prop against the hitch-socket. Pivotally connecting the prop or support to the hitch-socket permits said prop or support to be swung into vertical position, as shown in Figs. 11, 13 and 14 or into horizontal position directly underneath and parallel with the reach or tongue, as shown partly in dotted lines in Fig. 13.

The hitch-socket 58 is provided with a notch or pocket 70 on its under side adapted to receive the lock-nub 65 when the support or prop is swung into vertical position. The said notch or pocket is formed in a convex protuberance 71 on the under side of the hitch-socket and in order to disengage said lock-nub from its receiving notch or pocket it is only necessary to pull the support or prop downwardly to overcome the force of the spiral spring 68, which spring serves to retain the lock-nub in said notch or pocket when the support or prop is in vertical position. A downward pull on the support or prop is permitted due to the use of the slots 67, which will permit said support or prop to be swung from the vertical position shown in Figs. 11 and 13 to that shown in dotted lines in Fig. 13. When the support or prop is in horizontal position, the lock-nub will engage the lower end of a retainer lug 72 depending from the hitch-socket directly forward of the notch or pocket 70. Preferably the lug 72 is notched at its lower end, as at 73, to conform to the transverse formation of the lock-nub. It will, therefore, be apparent that in swinging the support or prop from horizontal position to vertical position, said support or prop must first be moved longitudinally or in a rearward direction to disengage the lock-nub 65 from the notch 73 in the retainer lug 72 and thence forwardly and downwardly. Under this swinging movement of the support, the lock-nub 65 will engage the convex protuberance 71 and under the force required to swing said support or prop, will ride over the convex surface of said protuberance and into the notch or pocket 70 and thus lock the support or prop in vertical or supporting position. This support or prop is, therefore, used to hold the chassis-frame of the trailer in substantially horizontal position, which is that usually desired when parking the trailer or when loading or unloading the same. At such times no connection need be made between the trailer and the automobile which is to pull the same. The support or prop may, however, be actuated when such connection is made.

For the purpose of attaching the hitch-socket to the bumper of a passenger automobile or to any other part of such or other type of vehicle, the front end of the hitch-socket may have an extension 74 cast therewith which may have an opening or be otherwise formed or constructed to permit of connecting it to an automobile or other pulling vehicle. Since the manner of hitching the trailer to an automobile forms no part of this invention, it is to be understood that any means serving the purpose of a hitch may be employed.

I preferably employ a comparatively small traction wheel 75 at the lower end of the support or prop and this is rotatable in a forked member 76 having a socket 77 at its upper end. To the lower end of the tube or pipe-like body 63 of the support or prop, a nipple 78 is threaded and fitted into the socket 77 is a swivel-pivot 79, having its upper end threaded into said nipple and being provided with a circumferential groove 80 within the socket 77 into which set-screws 81 extend which are passed through said socket. The small traction wheel 75 and the forked member in which it is rotatable are, therefore, free to swivel on the swivel pivot 79 at the lower end of the prop and by reason of the forked member having its lower forked portion curved to position the axis of the traction wheel 75 out of line with the axis of the support or prop, the traction wheel will be free to swing in any direction so that the front of the trailer can be conveniently moved about and brought into proper position with the part of an automobile to which the trailer is to be attached, or to otherwise position the trailer for loading or unloading. After attachment of the trailer to the automobile or other vehicle which is adapted to pull the same, the support or prop may be easily swung from vertical or supporting position to horizontal or non-supporting position. When the trailer is attached to the automobile the latter will serve to support the front end of the trailer and thus prevent the downward tilting of the trailer chassis.

In view of the fact that the axes of the main traction wheels 23 are in a vertical plane close to, and under certain adjustments of the wheel-supporting members, approximately in the same vertical plane as the pivotal connections of the trailer body 25 to the trailer chassis, the load is at all times fairly well centered over said wheels and thus the automobile to which the front end of the reach or tongue is attached is relieved of strain, or the strain applied thereto by reason of the attachment of a loaded trailer is reduced to the minimum.

The construction of the trailer thus far described includes a wheel-supporting member at each side of the trailer, the wheel-supporting members being forked at their lower ends to receive the traction wheel therebetween. Under such an arrangement a single traction wheel is employed with each wheel-supporting members and such arrangement is found suitable for transporting light and medium loads. However, for heavier loads I have designed wheel-supporting members with each of which dual traction wheels 23ª and 23ᵇ are employed.

In the wheel-supporting members of this modified form of my invention, the forked outer ends are eliminated and unforked or single curved arms extend from the spaced-apart lugs 36ª of the saddle-members to the traction wheels carried by said members. It may be found desirable to cast or otherwise construct the wheel-supporting members heavier than the members hereinbefore described, in which a single traction wheel is employed, but the yoke-like or V-formation for the wheel-supporting members is retained and the connection of these wheel-supporting members to the saddle-like members associated therewith is exactly like that provided for in the single wheel construction. The same saddle-members may be utilized and the load-sustaining springs are applied between the saddle-members and the rearwardly-extending portions of the arms of the wheel-supporting members in the same manner as those herein previously set out.

It may here be stated that by employing the yoke-like or V-formation for the wheel-supporting members, the end of one arm of each of said wheel-supporting members is spaced from and overlies the bight of said member and the inner end portion of the other arm thereof, and under this statement the spaced-apart rearwardly-extending arm portions 38 are to be considered as said "other arm."

In this modification, best shown in Fig. 9, I have eliminated the slot-and-bolt adjusting-means set out in the preferred construction and instead of such an arrangement have provided a set-screw 82 threaded through the collar-like portion of the saddle-member so as to impinge against the transverse tubular member 26. This fastening means will also permit rotatable adjustment of the saddle-members on the transverse tubular member 26, and is also shown in Figs. 3 and 17, as an alternate means of fastening. Loosening of this set screw will permit rotation of the saddle-member on the transverse tubular member so as to swing the wheel-supporting member and the spring-retainer member carried by the saddle-member and under such action of the wheel-supporting member and the adjustment of the spiral spring is exactly like that in the preferred construction. Since in the preferred construction, two coil springs are employed for each traction wheel, they may be constructed of lighter material than in the dual wheel-supporting member. In the latter case, the axle of the traction wheel is secured in the free extremity of the rearwardly-extending arm portion of the wheel-supporting member and projects from opposite sides thereof and on each projecting portion of the axle a traction wheel is mounted.

In the said modification a single, but considerably heavier coil spring is utilized and this coil spring is disposed between the traction wheels used with each wheel support or mounting.

It is possible that when traveling under speed over unimproved roads or other surfaces having pronounced or abrupt projecting portions or deep ruts that the jarring caused thereby may create a rebounding action of the traction wheels and the wheel-supporting arms carrying the same and thus cause the lugs 56 on the wheel-supporting members to forcibly strike against the stop lugs 55 on the saddle-members, and to check this action each of the saddle-members is provided with an upwardly and forwardly extending arm 83 to which one end of a suitable buffer-spring 84 is secured. The other end thereof being secured to an upwardly and forwardly extending arm 85 on the associated wheel-supporting arm 37 so as to cushion the action of the latter, as clearly shown in Fig. 17.

Many modifications within the spirit of my invention as set out in the appended claims may be resorted to, as it is not my intention to limit myself to the details of construction, nor to the combination of the particular parts shown and described, since many changes may be made which fairly fall within the scope of my invention as particularly set out in the claims hereof.

What I claim is:

1. A trailer chassis having a chassis-frame including a transverse tubular member having cylindrical end portions, a prop at the front end of said chassis-frame, saddle-members rotatably adjustable on the cylindrical end portions of said transverse tubular member and each having pivot lugs extending downwardly and forwardly and downwardly and rearwardly, respectively, a substantially V-shaped wheel-supporting member having one arm thereof overlying and spaced from the other, the first mentioned arm of each V-shaped supporting member being pivotally connected to the downwardly and forwardly projecting pivot lug of one of said saddle-members, a traction wheel mounted for rotation at the free end of the other arm of said V-shaped wheel-supporting member, and a spring device interposed between the downwardly and rearwardly projecting pivot lug of each saddle-member and the underlying arm of the associated wheel-supporting member.

2. A trailer chassis, comprising a chassis-frame having cylindrical portions at opposite sides thereof, saddle-members secured to said cylindrical portions and rotatably adjustable thereon, substantially V-shaped wheel-supporting members, each having the outer end of one of its arms pivotally connected to said saddle-member forward of a vertical plane in which the axes of said cylindrical frame portions are arranged and having the outer end of its other arm terminating a distance in rear of said plane, a traction wheel rotatable at the outer end of said last-mentioned arm, and a vertically-trending spiral spring located in rear of said vertical plane and interposed between said last-mentioned arm and said saddle-member, the trend of and resistance offered by said springs being varied under rotatable adjustment of said saddle-members on said cylindrical portions.

3. A trailer chassis, comprising a chassis-frame having cylindrical portions at opposite sides thereof, saddle-members secured to said cylindrical portions and rotatably adjustable thereon, substantially V-shaped wheel-supporting members, each member forming two diverging arms arranged in overlying relation and spaced apart and having the outer end of one of its arms pivotally connected to said saddle-member forward of a vertical plane in which the axes of said cylindrical frame portions are arranged and the outer end of its other arm terminating a distance in rear of said plane, each of said saddle-members having a downwardly extending pivot lug, a spring-retaining member pivotally connected to said pivot lug, a vertically-trending spiral spring interposed between said spring-retaining member and the last-mentioned arm of said V-shaped supporting member, the force of said springs being varied under rotatable adjustment of said saddle-members on said cylindrical portions and a traction wheel mounted for rotation at the outer end of each of said last-mentioned arms.

4. A chassis-frame for trailers including a transverse member having cylindrical terminals, collar-like saddle-members rotatably adjustable on said terminals and having pivot lugs at opposite sides of a vertical plane in which the axes of said terminals are arranged, a substantially V-shaped wheel-supporting member having the outer end of one of its arms pivotally connected to the pivot lug of each saddle-member at one side of said axes, a spring-retaining member pivotally secured to the pivot lug at the other side of said axes, a spiral spring between said spring-retaining member and the other arm of each wheel-supporting member, the force of said springs being varied under rotatable adjustment of said saddle-members on said cylindrical portions, a traction wheel secured to each of said last-mentioned arms, and means to prevent swinging movement of said wheel-supporting arms beyond predetermined points under action of said spiral springs.

5. A trailer chassis, comprising a chassis-frame having cylindrical horizontally disposed pivot portions at opposite sides, saddle-members rotatably adjustable on said pivot portions and each having forwardly and downwardly projecting pivot lugs and rearwardly and downwardly projecting pivot lugs, spring-retaining members pivotally secured to said last-mentioned pivot lugs, substantially V-shaped wheel-supporting members having the free ends of one of their arms pivotally spaced from and overlying the other arm of said wheel-supporting member and being connected to said forwardly and downwardly projecting pivot lugs and their other ends terminating in a vertical plane a distance in rear of the plane of said pivot portions, spiral springs interposed between said pivotally secured spring-retaining members and said last-mentioned arms, and co-acting stop lugs on said saddle-members and the first-mentioned arms of said wheel-supporting members to prevent undue rebound of the latter and to maintain said spiral springs under tension.

6. A trailer chassis, comprising a chassis-frame having tubular pivot portions at opposite sides thereof, saddle-members mounted on said pivot portions and each having a circumferentially-disposed slot therethrough and a toothed area along said slot, securing bolts passed through said tubular pivot portions from the inner sides thereof, a serrated lock plate having its teeth meshing with the teeth of said toothed areas, nuts applied to said bolts to retain said saddle-members in any adjusted position, each of said saddle-members having a forwardly and downwardly extending pivot lug, substantially V-shaped wheel-supporting arms connected to said pivot lugs, a second pivot lug extending rearwardly and downwardly from each saddle-member, a spring-retaining device pivotally secured to each of said second pivot lugs, springs interposed between said spring-retaining members and said wheel-supporting arms, and traction wheels rotatably on said wheel-supporting arms.

7. A trailer chassis, comprising a chassis-frame having horizontally-disposed pivot portions at opposite sides thereof, a wheel-supporting device having a saddle-member rotatably adjustable on each of said horizontally-disposed pivot portions and a wheel-supporting member pivotally connected to said saddle-member and having a free rearwardly-extending forked portion forming a pair of spaced-apart arms, a spiral spring between each of said spaced-apart arms and said saddle-member, said springs being varied in resistance under rotatable adjustment of said saddle-members on said pivot-portions and a traction wheel rotatable between each pair of spaced-apart arms.

8. A trailer chassis, comprising a chassis-frame having a forwardly-extending reach, a socket secured to the front end of said reach and having depending spaced-apart lugs, a prop formed of a tubular member and having one end positioned between said lugs, said prop having longitudinal slots through which and said depending lugs a pivot bolt is passed, a spiral spring within said prop having one end secured to said pivot bolt and its other end secured within said prop a distance from said pivot bolt, said socket having a lock notch and said prop having a lock nub adapted to enter said lock notch under action of said spiral spring to maintain said prop in vertical or supporting position, retainer means on said socket forward of said pivot bolt against which said lock nub bears when said prop is swung rearwardly into horizontal position, and a small traction wheel at the lower end of said prop.

9. A chassis for trailers, comprising a chassis-frame having horizontally-disposed pivot portions at opposite sides thereof, knee-action wheel-supports secured to said horizontally-disposed pivot portions including saddle-members rotatably adjustable around said horizontally-disposed pivotal portions and substantially V-shaped wheel-supporting members pivotally connected to said saddle-members and having the outer end of one of their arms overlying the inner ends of the other arms, springs between said saddle-member and said wheel-supporting members to control the swinging movement of the latter, each of said saddle-members and its co-acting wheel-supporting member having co-acting stop lugs to limit the movement of the wheel-supporting member under action of said springs, a lug extending forwardly and upwardly from each saddle-member, a lug extending forwardly and upwardly from each wheel-supporting member and spaced from said last-mentioned lug, and a buffer-spring interposed between said two last-mentioned lugs to be brought into action to check forceful contact of said stop lugs with each other.

10. A trailer chassis, comprising a chassis-frame formed as a unit of tubular members including a tubular transverse member having free projecting ends, collar-like saddle-members surrounding said free projecting ends and rotatably adjustable thereon, means to secure said saddle-members in any adjusted position on said free projecting ends, wheel-supporting members having diverging arms merging into a rearwardly-facing bight at their regions of approach to each other, the free end of one arm of each wheel-supporting member being pivotally secured to one of said collar-like saddle-members, traction wheels carried rotatably at the free ends of the other arms of said wheel-supporting members, and spiral springs interposed between said saddle-members and said last-mentioned arms, said springs exerting pressure against said last-mentioned arms at points between their bights and the axes of said traction wheels.

11. A trailer chassis, comprising a chassis-frame having pivot portions extending outwardly from opposite sides thereof, collar-like saddle-members mounted on said pivot portions and rotatably adjustable thereon, means to secure said saddle-members in any adjusted position on said pivot portions, wheel-supporting members pivotally secured to said saddle-members, spiral springs between said wheel-supporting members and said saddle-members changeable in carrying power and resistance under adjustment of said saddle-members on said pivot portions, and traction wheels carried by said wheel-supporting members.

EDWARD L. WIEDMAN.

REFERENCES CITED

The following references are of record in the file of this patent:

UNITED STATES PATENTS

| Number | Name | Date |
|---|---|---|
| 374,531 | Frogner | Dec. 6, 1887 |
| 1,428,368 | Frazier | Sept. 5, 1922 |
| 1,587,842 | Knox | June 8, 1926 |
| 1,779,887 | Melanson | Oct. 28, 1930 |
| 1,838,224 | Holloway | Dec. 29, 1931 |
| 1,840,435 | Davis | Jan. 12, 1932 |
| 2,141,781 | Allen | Dec. 27, 1938 |
| 2,182,077 | Feigelson | Dec. 5, 1939 |
| 2,227,762 | Ronning | Jan. 7, 1941 |
| 2,271,304 | Mulholland | Jan. 27, 1942 |
| 2,282,506 | Wachter | May 12, 1942 |
| 2,296,789 | Johnson | Sept. 22, 1942 |
| 2,325,822 | Whitmer | Aug. 3, 1943 |
| 2,375,363 | Hokanson | May 8, 1945 |